(12) United States Patent
Freudelsperger

(10) Patent No.: US 8,868,232 B2
(45) Date of Patent: Oct. 21, 2014

(54) DEVICE AND PROCESS FOR RECOGNIZING AND GUIDING INDIVIDUALLY PACKAGED PRODUCTS WITH A CODE

(75) Inventor: Karl Freudelsperger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 455 days.

(21) Appl. No.: 13/254,507

(22) PCT Filed: Feb. 18, 2010

(86) PCT No.: PCT/EP2010/001015
§ 371 (c)(1),
(2), (4) Date: Sep. 2, 2011

(87) PCT Pub. No.: WO2010/099874
PCT Pub. Date: Sep. 10, 2010

(65) Prior Publication Data
US 2012/0004763 A1    Jan. 5, 2012

(30) Foreign Application Priority Data
Mar. 2, 2009  (DE) .......................... 10 2009 011 230

(51) Int. Cl.
G06F 7/00    (2006.01)
B65G 1/137   (2006.01)

(52) U.S. Cl.
CPC .................................. *B65G 1/1378* (2013.01)
USPC . 700/225; 198/341.07; 198/395; 198/550.01; 141/82

(58) Field of Classification Search
USPC ........................................................ 700/225
See application file for complete search history.

(56) References Cited

U.S. PATENT DOCUMENTS

| | | | |
|---|---|---|---|
| 4,819,783 A | | 4/1989 | Pinyan et al. |
| 6,059,508 A | * | 5/2000 | Wunscher et al. ............ 414/276 |
| 6,401,936 B1 | * | 6/2002 | Isaacs et al. .................. 209/656 |
| 6,540,062 B2 | * | 4/2003 | Wunscher et al. ............ 198/395 |
| 7,748,519 B2 | * | 7/2010 | Freudelsperger ........ 198/550.01 |
| 7,828,639 B2 | * | 11/2010 | Nielsen .......................... 452/198 |
| 2002/0063036 A1 | * | 5/2002 | Wunscher et al. ....... 198/341.07 |

FOREIGN PATENT DOCUMENTS

| | | |
|---|---|---|
| DE | 3119329 A1 | 11/1982 |
| DE | 10000684 A1 | 7/2001 |
| DE | 10209864 A1 | 9/2003 |
| DE | 102006035050 A1 | 1/2008 |
| EP | 0310411 A1 | 4/1989 |

(Continued)

*Primary Examiner* — Gene Crawford
*Assistant Examiner* — Kyle Logan
(74) *Attorney, Agent, or Firm* — McGlew and Tuttle, P.C.

(57) ABSTRACT

An arrangement and a method are provided for detecting and controlling piece goods (2) having a code, preferably of piece goods commissioned in a commissioning system for a complete commissioning order. The piece goods of a quantity, preferably a commissioning order, are singulated and centered on a transport route (3) and fed through a scanning device (15), and are identified as actual data in the scanning device (15) by reading the code of the piece goods (2). This is compared or captured to target data of the piece goods quantity. The piece goods are separated out if the target data do not match the actual data. A first transport route (3) has a V-shaped cross-section, the one V-arm thereof being a driven piece goods transport element (5) preferably a drive recirculating conveyor belt, and the other V-arm thereof being a stationary piece goods sliding element (6), preferably a sheet metal slide.

22 Claims, 7 Drawing Sheets

(56) References Cited

FOREIGN PATENT DOCUMENTS

| EP | 1339007 | A1 | 8/2003 |
| GB | 1445100 | A | 8/1976 |
| WO | 9847790 | A1 | 10/1998 |
| WO | 03074201 | A1 | 9/2003 |

\* cited by examiner

Fig. 7
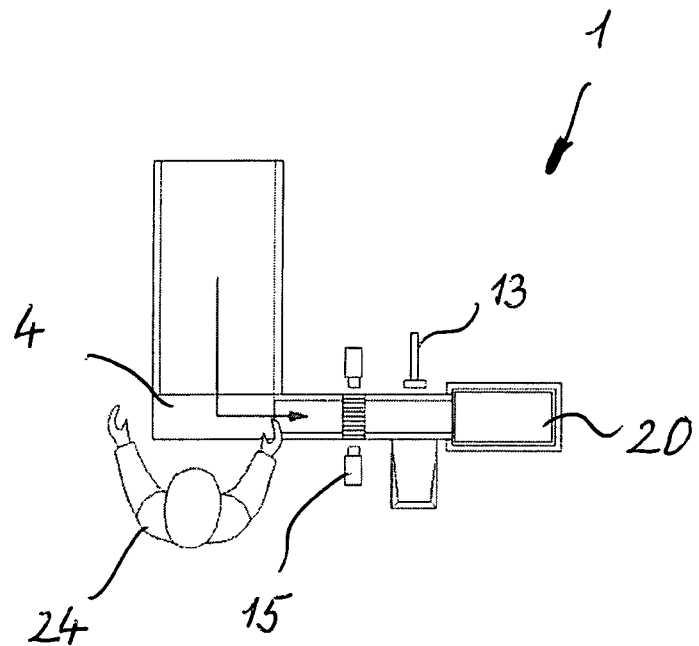
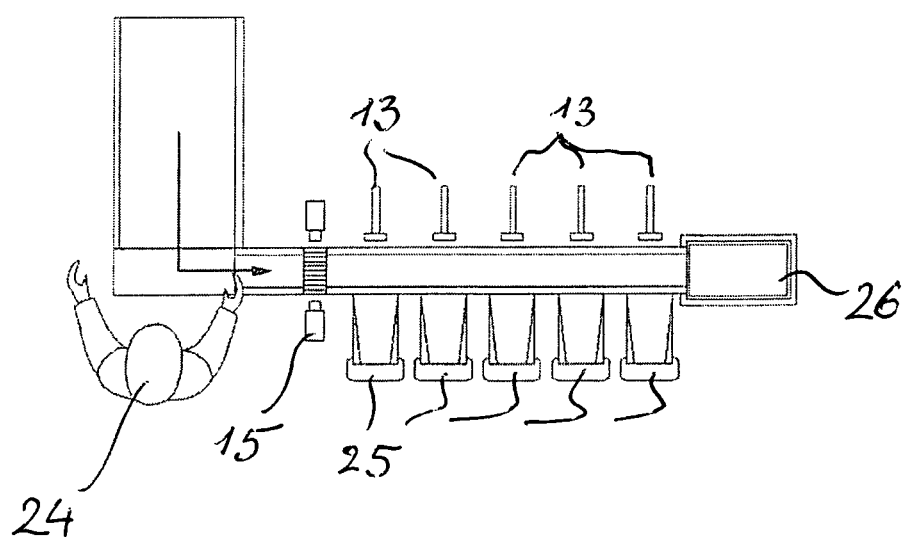
Fig. 8

DEVICE AND PROCESS FOR RECOGNIZING AND GUIDING INDIVIDUALLY PACKAGED PRODUCTS WITH A CODE

CROSS REFERENCE TO RELATED APPLICATIONS

This application is a U.S. National Phase application of International Application PCT/EP2010/001015 and claims the benefit of priority under 35 U.S.C. §119 of German Patent Application DE 10 2009 011 230.8 filed Mar. 2, 2009, the entire contents of which are incorporated herein by reference.

FIELD OF THE INVENTION

The present invention pertains to a device and a process for recognizing and guiding individually packaged products provided with a code, preferably individually packaged products of a complete commissioning order commissioned in a commissioning unit, whereby the individually packaged products of a quantity, and preferably of a commissioning order, are guided separated and centered on a conveying track, which has a V-shaped cross section, through a scanning device with a plurality of individual scanners and are identified in the scanning device by reading the code of the individually packaged product as actual data and are then compared or detected with the desired data, which are stored in a central computer, of the individually packaged product quantity, and if there is disagreement of the desired data with the actual data, the individually packaged product is separated out.

BACKGROUND OF THE INVENTION

According to the state of the art, different individually packaged products are stored in a warehouse in bays at a certain location, sorted by kinds. When placing a commissioning order of a customer, the desired goods or individually packaged products are removed manually by an operator or, for example, at a wholesale dealer, automatically in a commissioning unit from the destination site in the warehouse and fed to a transport container, for example, a tub. The tub preferably contains the products of a complete commissioning order, is guided to a shipping area and from there is finally transported to the customer.

The difficulty lies in guaranteeing that the correct products were assigned to each commissioning order. In order to guarantee this, each order must be checked.

One possibility of checking is, for example, weighing an empty and a filled container in case of a commissioning order and calculating the total weight of the filled container from the known individual weights of the individually packaged products besides the known empty weight of the container. However, many different individually packaged products often have approximately the same weight, so that the weighing method is only conditionally reliable. If there is no difference, in weighing, between the set weight and the actual weight of a commissioning order, then the correct composition of a desired commissioning order cannot hence be absolutely concluded. If there is a difference between the set weight and the actual weight, then the error is unknown for the most part and can often be eliminated only with difficulty by all individual products of the container having to be taken once more from the container and checked manually in order to determine definitively which product is missing or if too much is present. This means not only a tremendous expenditure of time, but also a high cost factor, which is reflected, if nothing else, in the price of the product.

To lower costs and expense, according to the state of the art, the products or individually packaged products are provided with a bar code beforehand, i.e., still before storing the individually packaged products in the warehouse. The thus identified individually packaged products are taken from the container for checking and fed manually to a reading device or a hand scanner, which is capable of identifying the product by the bar code. It is understood that such an identification process is nevertheless expensive.

In order to recognize a large number of individually packaged products comparatively quickly for the purpose of optionally introducing corrective measures, the "check station" mentioned in the introduction, whose conveying track, which has a V-shaped cross section, is a diagonal chute, on which the individually packaged products, fed manually separately, slide through a scanning tunnel because of their gravity and are hereby read and checked and are possibly subsequently sorted out, is known from DE 102 09 864 A1. However, it was shown that the sliding speed is undefined and limited, and a reliable centering in the V angle of the chute and reliable multidimensional scanning in case of high throughput of individually packaged products are only conditionally possible.

SUMMARY OF THE INVENTION

An object of the present invention is to provide a device and a process of the type mentioned in the introduction, which is capable of recognizing a large number of individually packaged products by simple means in case of rapid throughput of individually packaged products and, nevertheless, high reliability of a three-dimensional scanning, in order to be able to optionally introduce corrective measures very quickly and very reliably.

The essence of the device for recognizing and guiding individually packaged products provided with a code according to the present invention, preferably of individually packaged products of a complete commissioning order commissioned in a commissioning unit, is the design of a conveying track, which has a V-shaped cross section, whose one V leg is a driven individually packaged product-conveying element, preferably a driven circular conveying belt, on which the conveyed individually packaged product lies in a nonsliding manner, and whose other V leg is a stationary individually packaged product-sliding element, preferably a sliding plate, on which the conveyed individually packaged product slides.

The conveying track (first conveying track) in this case preferably runs in the horizontal direction, whereby the two V legs form an angle of at least 90°, preferably form exactly a right angle, and at least one of the V legs, preferably both V legs form an angle of 45° to the horizontal.

In particular, the first conveying track, in the longitudinal direction, is composed of two (first and second) conveying sections aligned with one another, each consisting of an individually packaged product-conveying element and of an individually packaged product-sliding element, whereby the individually packaged product-sliding element of the second conveying section is connected, aligned, to the individually packaged product-conveying element of the first conveying section, and inversely, the individually packaged product-conveying element of the second conveying section is connected, aligned, to the individually packaged product-sliding element of the first conveying section.

The individually packaged product-sliding element may be designed as light-transparent to be able to scan the sliding underside of a conveyed individually packaged product as well. Provisions are, however, preferably made for a stationary light-transparent section, especially a glass window, to be arranged directly downstream aligned with the non-light-transparent individually packaged product-sliding element, whereby the length of the individually packaged product-conveying element corresponds approximately to the sum of the individual lengths of the individually packaged product-sliding element and of the light-transparent section.

In the area of the light-transparent section, and especially of the glass window, a three-dimensional scanning device with preferably three individual scanners is provided, whose first individual scanner reads the possible code on the sliding surface of a conveyed individually packaged product through the light-transparent section, and whose other individual scanners read possible codes of other side surfaces of the conveyed individually packaged product, but the first individual scanner does not read the side surface of the individually packaged product that lies on the individually packaged product-conveying element in a nonsliding manner.

An especially effectively working device with high throughput capacity of individually packaged products provides for each of the two conveying sections to have a (first or second) scanning device each with preferably three individual scanners as well as a (first or second) light-transparent section, especially a (first or second) glass window, whereby an individual scanner of the second conveying section reads a possible code of the up to now unread side surface of the individually packaged product that was lying beforehand in a nonsliding manner on the individually packaged product-conveying element of the first conveying section through the associated second light-transparent section. During operation, the first belt thus pulls an individually packaged product over the first glass window. Here, the first unknown side is canned. After that, the (second) belt changes to the other side in order to be able to draw the second unknown side over the second glass window.

In the area of the longitudinal end of the first conveying track there is provided a selecting means for a lateral or lower ejection of individually packaged products that are not recognized by the scanning device(s) or are to be sorted out. The selecting means, which can be controlled by the central computer, has at least one transverse pusher, at least one diverter or at least one pivoting flap, which releases an ejection opening.

Inversely, the selecting means may also be used for a lateral selecting of recognized individually packaged products and the longitudinal end of the first conveying track may be used for an ejection of the individually packaged products that are not recognized or are to be sorted out.

In particular, a process according to the present invention for recognizing and guiding individually packaged products provided with a code is characterized in that the individually packaged products of a commissioning order are fed manually by an operator to the first conveying track preferably simultaneously, in pairs and spaced apart from one another.

If the distance of two simultaneously fed individually packaged products selected by the operator is too small to make possible a reliable scanning of two individually packaged products spaced apart from one another at the adjusted, usually high, conveying speed of the first conveying track in the range of one m/sec and a reliable discharging at the selecting means, a distance recognition means, and especially a distance light barrier, provides an automatic turning off of the drive of the first conveying track or of the drive of the individually packaged product-conveying element of the first conveying track. The operator may then place the individually packaged products, which are spaced too close to one another, with new greater distance again onto the conveying track and restart the drive by pressing a button at a terminal.

It is desirable to keep the distance between the individually packaged products to be scanned as low as possible, and especially in the range of 200 mm. Due to the possible low individually packaged product distance, two individually packaged products can be read in two scanning devices spaced apart from one another, which is desirable for achieving a high throughput rate. By means of fixed cycle tracking combined with the identification of the cameras or scanners and the measurement of the individually packaged product length by means of the distance light barrier, one knows which code belongs to which individually packaged product or which individually packaged product does not have a code.

According to the present invention, consequently only one side of the "V belt" is a driven belt in the first conveying track. The other side is a fixed sliding plate. The individually packaged products are automatically aligned in the V angle only by this combination, and only this alignment enables the scanners or cameras to detect an optimal image. If both sides of the "V belt" were driven, the alignment would not be reliable, especially not at the high conveying speed according to the present invention, preferably in the range of one m/sec. It depends on the "relative speed" between the two sides of the "V belt," which makes possible a local rotation of a fed individually packaged product until the individually packaged product has found its stable position in the V angle. It would hence also be theoretically conceivable to use another driven circular belt with a different speed instead of the fixed sliding plate; however, in practice it is impractical because of the greater expense.

Therefore, according to the present invention, a check station is suggested, which can be operated with high throughput rate with high reliability because of the highly defined, adjustable conveying speed of the first conveying track (by contrast to a prior-art "chute" of the state of the art mentioned in the introduction) and because of the low minimum distance between two individually packaged products to be scanned, especially if two scanning devices spaced apart from one another are each provided with three individual scanners.

When containers are mentioned here, it is understood that they may also be a different receptacle for individually packaged products in the present invention, for example, pallets or trays.

The device according to the present invention and the process according to the present invention are explained in detail below based on exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a schematic top view showing a schematic diagram of the device according to the present invention; and FIG. 8 is a schematic top view, similar to FIG. 7, showing a schematic diagram of an alternative device according to the present invention.

DESCRIPTION OF THE PREFERRED EMBODIMENTS

Figure 1:
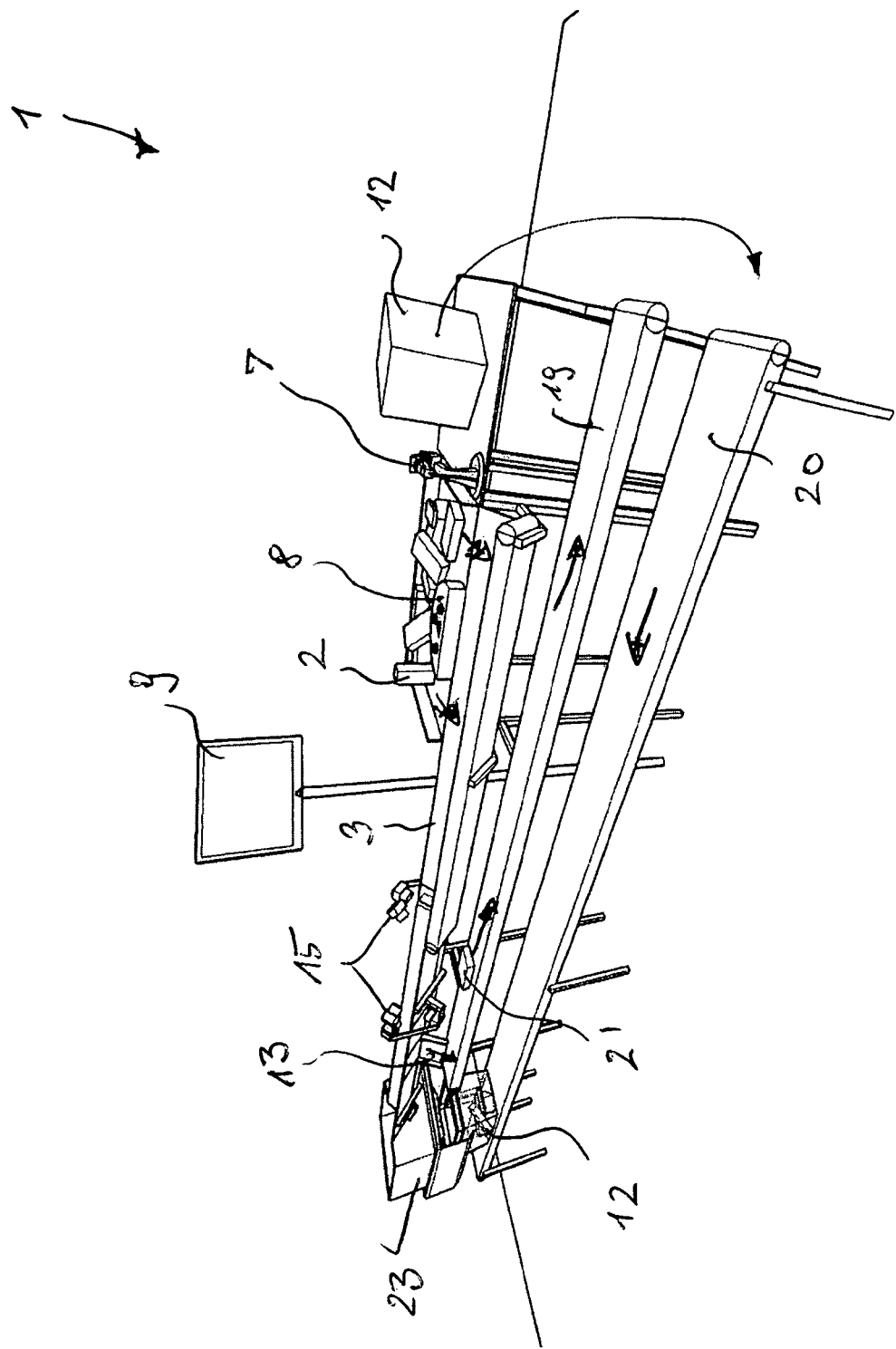
FIG. 1 is a schematic perspective lateral view of the device according to the present invention for recognizing and guiding individually packaged products provided with a code.
Figure 2:
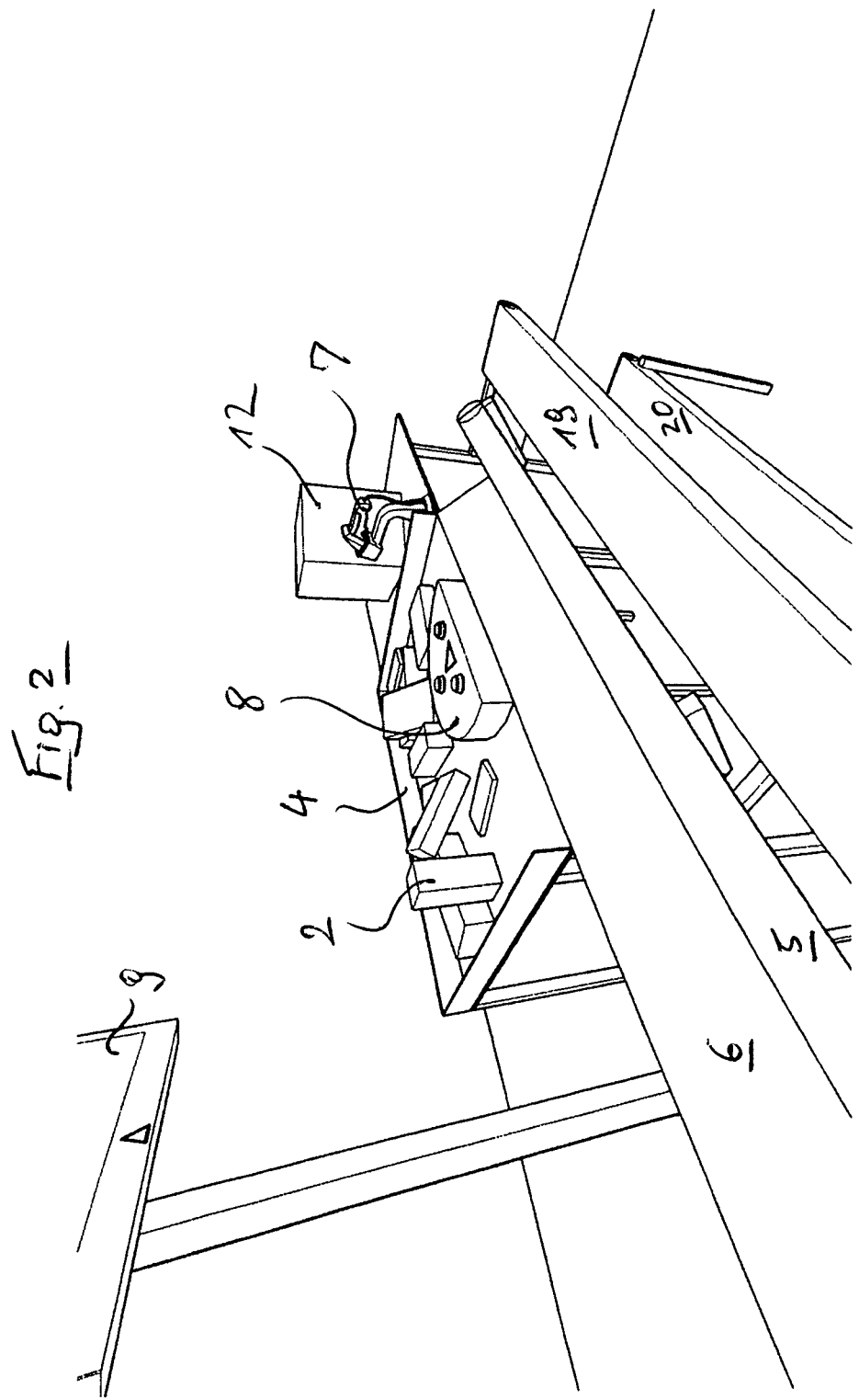
FIG. 2 is a schematic perspective view showing the detail of the inlet area of the device according to FIG. 1, with working surface, terminal, as well as first, second and third conveying tracks, especially the workstation of an operator.
Figure 3:
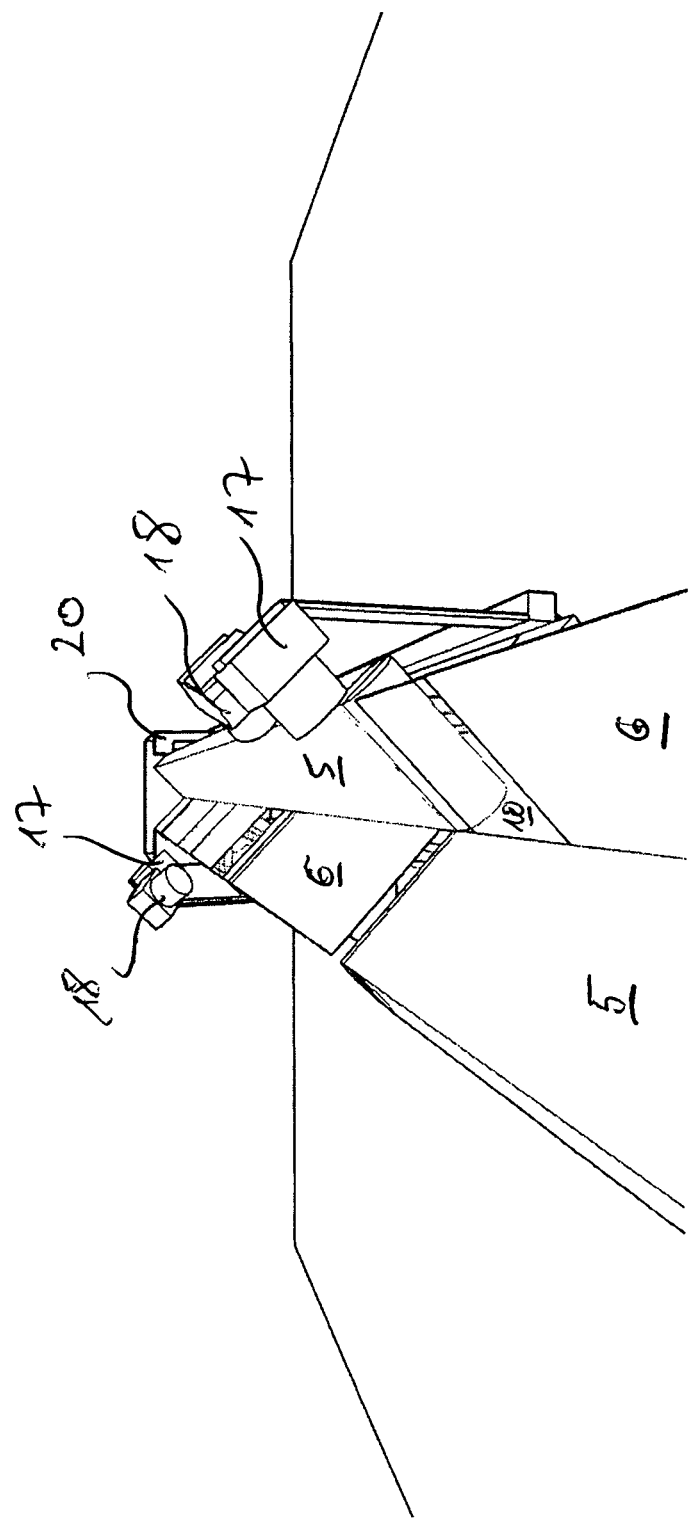
FIG. 3 is a front view showing the first conveying track consisting of two conveying sections in addition to individual scanners.
Figure 4:
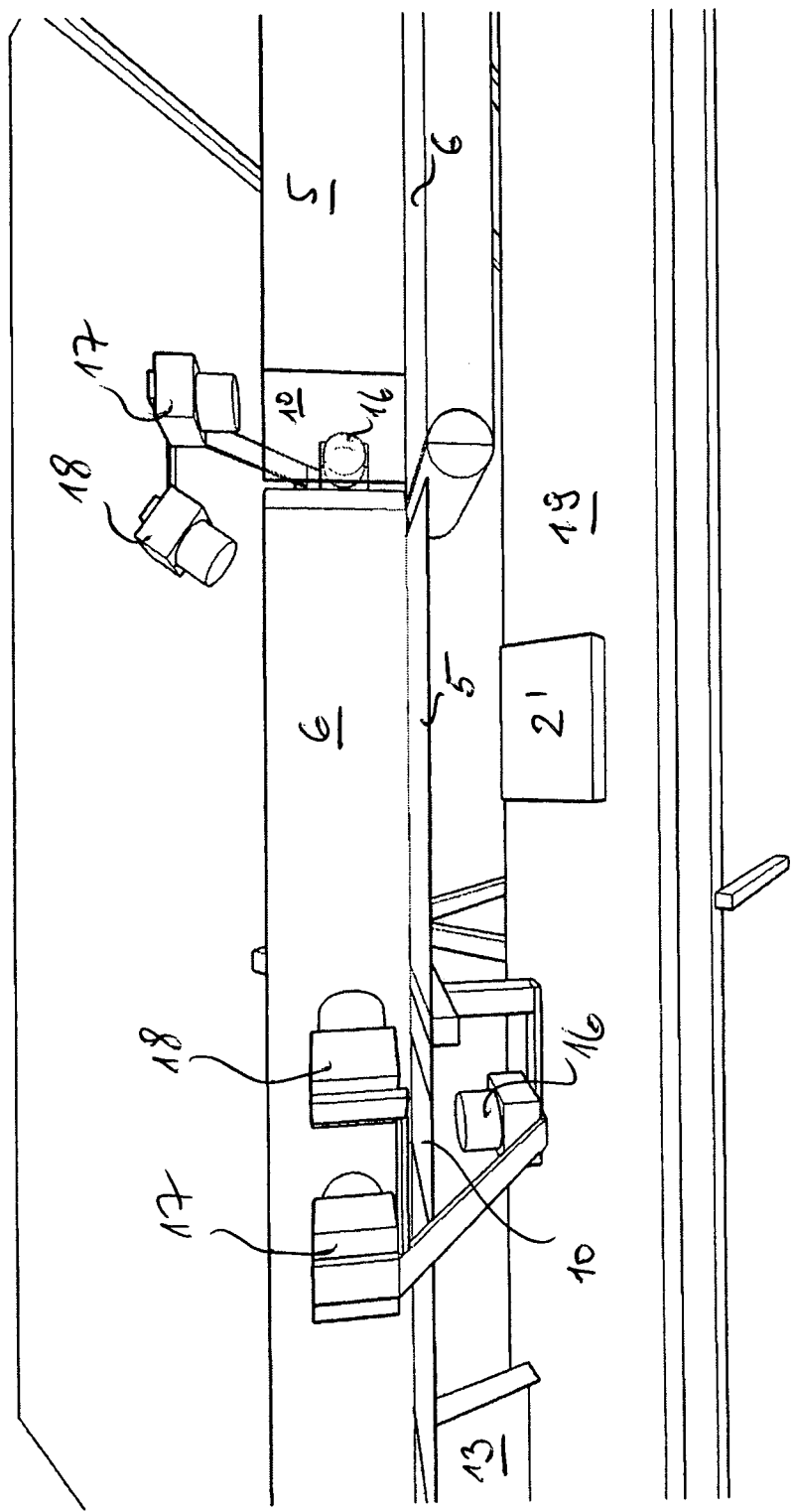
FIG. 4 is a schematic top view of the device according to FIG. 1 in the area of the individual scanner.

Referring to the drawings in particular, a device 1 for recognizing and guiding individually packaged products provided with codes shown in FIGS. 1 through 7 is part of a commissioning unit, in which individually packaged products are commissioned in a manner not of detailed interest here. The commissioned individually packaged products of a commissioning order are collected in an (order) container 12. It is essential to check the contents of the container 12 by number of pieces and type of individually packaged products, i.e., the commissioning order.

The codes are data matrix codes, in which the following data contents are coded: product identification, batch information, expiration date, serial number.

The commissioning unit has a central computer (not shown), to which the device described below is connected via a terminal.

The device 1 for recognizing and guiding a quantity of individually packaged products 2 provided with a code has a first conveying track 3 that has a V-shaped cross section. The individually packaged products of a commissioning order are guided separated and centered and pass through a scanning device 15 with a plurality of individual scanners 16, 17, 18 and are identified as actual data in the scanning device 15 by reading the code of the individually packaged product 2 and are compared with the desired data, stored in the central computer, of the individual packaged product quantity, and if there is disagreement of the desired data with the actual data, the individually packaged product is separated out.

In particular, the one V leg of the first conveying track 3, which has a V-shaped cross section, is a driven individually packaged product-conveying element 5, especially a driven circular conveyor belt, on which the conveyed individually packaged product 2 lies in a nonsliding manner.

The other V leg of the first conveying track 3 is a stationary individually packaged product-sliding element 6, especially a sliding plate, on which the conveyed individually packaged product 2 slides, on the other hand.

The first conveying track 3 is arranged horizontally.

The two V legs form an angle of at least 90° and they form exactly a right angle in the exemplary embodiment of the drawings.

At least one of the V legs forms an angle of 45° to the horizontal, and both V legs in the exemplary embodiment of the drawings.

In particular, in the longitudinal direction, the first conveying track 3 is composed of two (first and second) conveying sections aligned with one another, each consisting of an individually packaged product-conveying element 5 and an individually packaged product-sliding element 6, whereby the individually packaged product-sliding element 6 of the second conveying section is connected, aligned, to the individually packaged product-conveying element 5 of the first conveying section, and inversely, the individually packaged product-conveying element 5 of the second conveying section is connected, aligned, to the individually packaged product-sliding element 6 of the first conveying section.

A stationary light-transparent section 10, and especially a glass window, is arranged directly downstream aligned with the non-light-transparent individually packaged product-sliding element 6, whereby the length of the individually packaged product-conveying element 5 corresponds approximately to the sum of the individual lengths of the individually packaged product-sliding element 6 and of the light-transparent section 10.

In the area of the light-transparent section 10 or of the glass window, a three-dimensional scanning device 15 with preferably three individual scanners 16, 17, 18 is provided, whose first individual scanner 16 reads the possible code on the sliding surface of a conveyed individually packaged product through the light-transparent section 10, and whose other individual scanners 17, 18 read possible codes of other side surfaces of the conveyed individually packaged product, but the first individual scanner does not read the side surface of the individually packaged product that lies on the individually packaged product-conveying element 5 in a nonsliding manner.

Each of the two conveying sections has a (first or second) scanning device 15 each with preferably three individual scanners 16, 17, 18 as well as a (first or second) light-transparent section 10 or a (first or second) glass window, whereby an individual scanner 16 of the second conveying section reads a possible code of the up to now unread side surface of the individually packaged product that was lying beforehand in a nonsliding manner on the individually packaged product-conveying element 5 of the first conveying section through the associated second light-transparent section 10.

Figure 5:
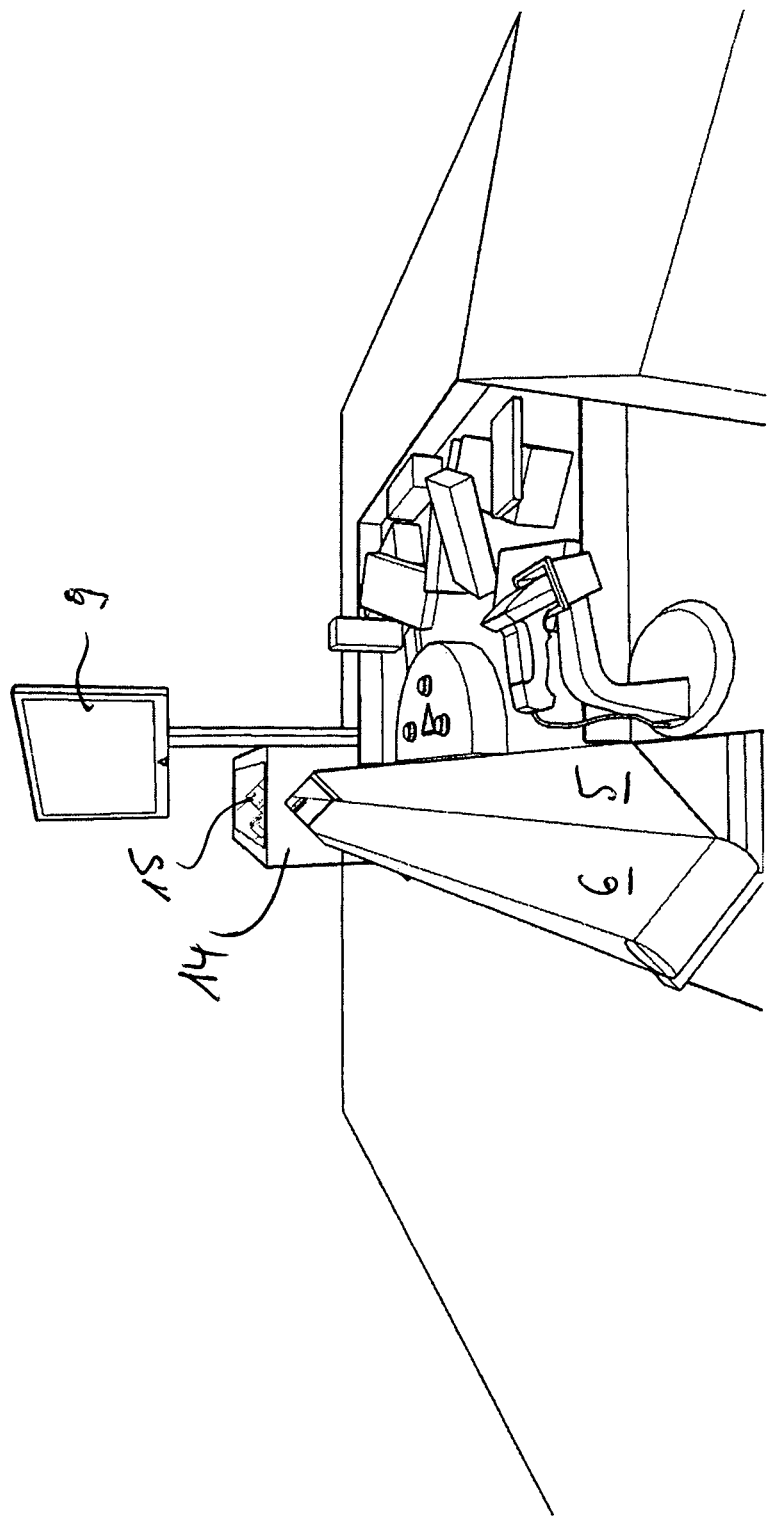
FIG. 5 is a schematic perspective view showing a device similar to FIG. 3 with a scanning tunnel.

The scanning devices 15 are optionally arranged in a scanning tunnel 14 according to FIG. 5 selecting means 13 for a lateral or lower ejection of individually packaged products 2' which are not recognized by the scanning device 15 or which are to be sorted out is provided in the area of the longitudinal end of the first conveying track 3.

Ejected, non-recognized individually packaged products 2' can be returned on a second conveying track 19 for a manual scanning by means of a hand scanner 7 and optionally for sorting out in the area of the inlet of the first conveying track 3 and can optionally be received in a container kept ready.

A container 12 that is empty or filled with hand-scanned individually packaged products on a third conveying track 20 can be conveyed from the area of the inlet of the first conveying track 3 under the longitudinal end of the first conveying track into a ready position.

Individually packaged products recognized by the scanning device 15 at the longitudinal end of the first conveying track 3 are delivered into the container 12 kept ready.

A buffer 23 with a flap that can be opened on the bottom for a guided delivery of buffered, scanned individually packaged products 2 into the container 12 kept ready is provided at the longitudinal end of the first conveying track 3.

The selecting means 13, which can be controlled by means of the central computer, has at least one transverse pusher, at least one diverter or at least one pivoting flap 21, which releases an ejection opening.

Figure 6:
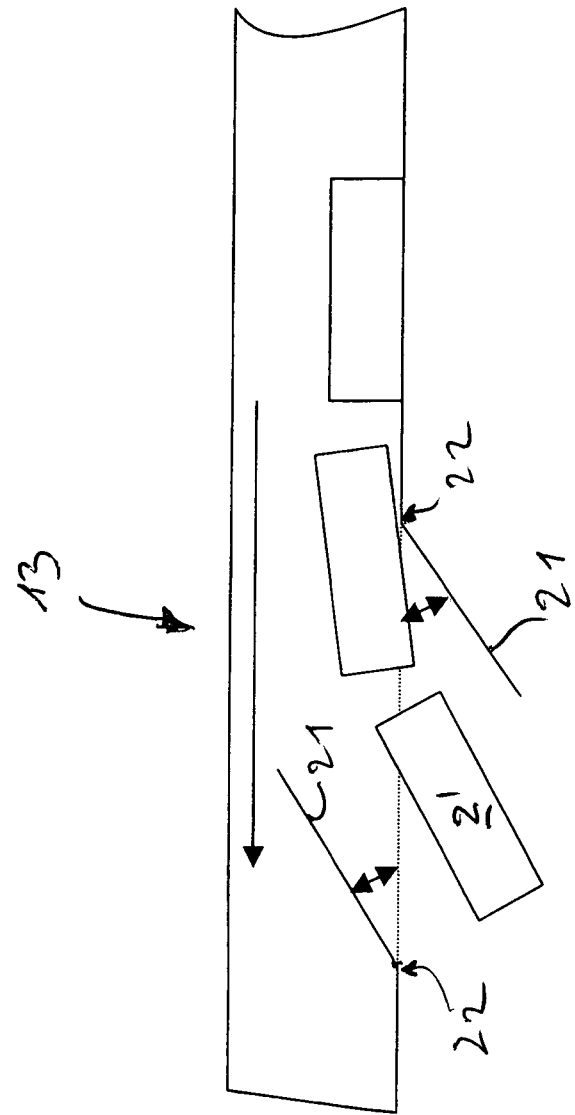
FIG. 6 is a schematic top view of the device according to FIG. 1 in the area of the selecting means.

The pivoting flap 21 may be designed as a counter-controlled double flap with two pivot axes 22 according to FIG. 6.

The terminal comprises a keyboard 8, a display screen 9 and a bidirectional wired connection to the individual scanners 16, 17, 18 of the scanning devices 15 as well as to the hand scanner 7 for a connection to the central computer for recognizing the desired data or identifying the individually packaged products, especially the individually packaged products of a complete commissioning order, as well as for comparing the actual data with the desired data of the individually packaged product quantity.

Furthermore, a spacer is provided for a simultaneous manual entry of two individually packaged products 2 that are spaced apart from one another on the first conveying track 3. In the exemplary embodiment of the drawings, the spacer is the keyboard 8 of the terminal, as this can be seen in FIGS. 1 through 3, for example.

A feed table 4 is located on the inlet side for the individually packaged products 2 approximately at the level of the inlet of the first conveying track 3.

Finally, a (not shown) distance light barrier is provided for the purpose of automatic turning off of the drive of the individually packaged product-conveying element 5 in case of undershooting a minimum distance of two individually packaged products to be scanned consecutively. Similar to the first individual scanner 16 behind the glass window, the distance light barrier is located behind the individually packaged product-sliding element 6 or sliding plate and recognizes an individually packaged product conveyed past through an opening in the sliding plate, and especially its length, as well as the distance between two conveyed individually packaged products by means of measuring time. The (minimum) distance between two conveyed individually packaged products, which it is essential to check, is obtained based on the known conveying speed of the first conveying track 3. If the minimum distance is undershot, the individually packaged product-conveying element 5 or the circular belt stops automatically. An operator then repositions the individually packaged products that are placed too close to one another on the first conveying track 3 and restarts the circular belt by pressing a button on the keyboard 8.

During operation, the individually packaged products 2 of a commissioning order are then placed or dumped out by an operator 24 from a container 12 containing [sic, "enthaltenen" (contained) should be "enthaltenden"—Tr. Ed.] the individually packaged products of the commissioning order onto the feed table 4 arranged upstream of the first conveying track 3 and fed to the first conveying track 3 separately, in particular, simultaneously, in pairs and spaced apart from one another. The operator 24 pulls an individually packaged product with both hands to the body into the V belt. The individually packaged products are taken over by the V belt and fed aligned to the scanning area. Two consecutive individually packaged products spaced apart from one another can be scanned simultaneously. Scanned and hereby recognized individually packaged products reach the longitudinal end of the first conveying track 3 and from there the buffer 23 or collecting hopper.

Before dumping out or placing the individually packaged products onto the feed table 4, however, bulky, heavy, sensitive, awkward and/or round individually packaged products are separated out from the container 12 or from the feed table 4 by the operator 24 and are identified in a hand scanner 7 or by entering the actual data on the keyboard 8 of a terminal of the central computer and the identified individually packaged products are subsequently placed back in the container again.

The container 12 is placed on the third conveying track 20 and is then conveyed from there under the outlet of the first conveying track 3 into a ready position, which then takes over the scanned and recognized individually packaged products 2 of the buffer 23.

Scanned and not recognized individually packaged products 2' are separated out by the selecting means 13 and then returned into the area of the start of the first conveying track 3 via the second conveying track 11.

The returned individually packaged products 2' are identified by the operator 24 by means of the hand scanner 7 or by entering the actual data on the keyboard 8 of the central computer.

Hereby recognized individually packaged products of the commissioning order are again guided via the first conveying track 3 to the container 12 under the outlet of the first conveying track 3.

Not recognized individually packaged products are transferred to a place for separating out or are fed back into a commissioning warehouse.

The individually packaged product is acoustically or visually identifiable to an operator 24 at least when the desired data are in agreement with the actual data.

Also, a recognition report is prepared about a correct commissioning order.

A report about an error in commissioning may likewise be prepared.

In an alternative embodiment, the "check station" according to the present invention according to the schematic diagram according to FIG. 7 may be converted into a filling station for individual orders according to the schematic diagram according to FIG. 8. In this case, especially a plurality of selecting means 13 arranged one behind the other are then used for a lateral or lower ejection of individually packaged products, recognized by the scanning devices 15, into assigned single-order containers 25, while the longitudinal end of the first conveying track 3 is used as an ejection 26 of non-recognized individually packaged products.

By means of the present invention, a large number of individually packaged products or products can be recognized in a simple manner, very reliably and very quickly, for the most part in a semi-automatic manner by means of the device 1 in a simple ergonomic operation and the commissioning order can thus be checked. Only atypical individually packaged products are, as previously, hand-scanned.

While specific embodiments of the invention have been described in detail to illustrate the application of the principles of the invention, it will be understood that the invention may be embodied otherwise without departing from such principles.

The invention claimed is:

1. A device for recognizing and guiding individually packaged products provided with a code, the device comprising:
   a conveying track having a V-shaped cross section;
   a scanning device with a plurality of individual scanners; and
   a central computer, whereby the individually packaged products of a quantity, are guided separated and centered on the conveying track, which has the V-shaped cross section, through the scanning device with the plurality of individual scanners and are identified in the scanning device by reading the code of the individually packaged product as actual data and are then compared or detected with the desired data, stored in the central computer, of the individually packaged product quantity, and if there is disagreement of the desired data with the actual data, the individually packaged product is separated out, wherein the conveying track, which has the V-shaped cross section, has one V leg comprising a driven individually packaged product-conveying element on which the conveyed individually packaged product lies in a nonsliding manner, and has another V leg comprising a stationary individually packaged product-sliding element on which the conveyed individually packaged product slides, wherein in a longitudinal direction, the conveying track comprises first and second conveying sections aligned with one another, each comprising an individually packaged product-conveying element and an individually packaged product-sliding element, whereby the individually packaged product-sliding element of the second conveying section is connected, aligned, to the individually packaged product-conveying element of the first conveying section, and inversely, the individually packaged product-conveying element of the second conveying section is connected, aligned, to the individually packaged product-sliding element of the first conveying section.

2. A device in accordance with claim 1, wherein the conveying track is arranged horizontally.

3. A device in accordance with claim 1, wherein the two V legs form an angle of at least 90°.

4. A device in accordance with claim 1, wherein at least one of the V legs forms or form an angle to 45° to the horizontal.

5. A device in accordance with claim 1, wherein the scanning device is arranged in a scanning tunnel.

6. A device in accordance with claim 1, further comprising: a feed table for feeding the individually packaged products approximately at the level of the inlet of the first conveying track.

7. A device in accordance with claim 1, further comprising: a distance recognition means for the purpose of automatic turning off of the drive of the individually packaged product-conveying element in case of undershooting a minimum distance of two individually packaged products to be scanned consecutively.

8. A device in accordance with claim 1, wherein a stationary light-transparent section is arranged directly downstream aligned with the individually packaged product-sliding element which is non-light-transparent, whereby the length of the individually packaged product-conveying element corresponds approximately to the sum of the individual lengths of the individually packaged product-sliding element and of the light-transparent section.

9. A device in accordance with claim 8, wherein in the area of the light-transparent section, and especially of the glass window, a three-dimensional scanning device with preferably three individual scanners is provided, whose first individual scanner reads the possible code on the sliding surface of a conveyed individually packaged product through the light-transparent section, and whose other individual scanners read possible codes of other side surfaces of the conveyed individually packaged product, but first individual scanner does not read the side surface of the individually packaged product that lies in a nonsliding manner on the individually packaged product-conveying element.

10. A device in accordance with claim 9, wherein each of the two conveying sections has a first or second scanning device, each with three individual scanners as well as a first or second light-transparent section, whereby an individual scanner of the second conveying section reads a possible code of the up to now unread side surface of the individually packaged product that was lying beforehand in a nonsliding manner on the individually packaged product-conveying element of the first conveying section through the associated second light-transparent section.

11. A device in accordance with claim 1, further comprising: a selecting means, for a lateral or lower ejection of individually packaged products that are not recognized by the scanning device or are to be sorted out, the selecting means being provided in an area of a longitudinal end of the first conveying track.

12. A device in accordance with claim 11, wherein the selecting means, which can be controlled by means of the central computer, has at least one transverse pusher, at least one diverter or at least one pivoting flap, which releases an ejection opening.

13. A device in accordance with claim 12, wherein the pivoting flap is a counter-controlled double flap with two pivot axes.

14. A device in accordance with claim 11, further comprising: another conveying track wherein ejected, non-recognized individually packaged products can be returned on the another conveying track for a manual scanning by means of a hand scanner and optionally for sorting out in the area of the inlet of the first conveying track and can be received in a provided container.

15. A device in accordance with claim 14, further comprising a terminal with a keyboard, a display screen and a bidirectional wired connection to the individual scanners of the scanning device as well as to the hand scanner for a connection to the central computer for recognition of the desired data or identification of the individually packaged products, as well as for a comparison of the actual data with the desired data of the individually packaged product quantity.

16. A device in accordance with claim 14, further comprising a spacer for a simultaneous manual entry of two individually packaged products spaced apart from one another on the first conveying track, whereby the spacer is preferably the keyboard of the terminal.

17. A device in accordance with claim 14, further comprising a third conveying track wherein a container kept ready that is empty or filled with hand-scanned individually packaged products on the third conveying track can be conveyed from the area of the inlet of the conveying track under the longitudinal end of the conveying track into a ready position.

18. A device in accordance with claim 17, wherein individually packaged products recognized by the scanning device at the longitudinal end of the conveying track are delivered into the container kept ready.

19. A device in accordance with claim 17, further comprising a buffer with a flap that can be opened on the bottom for a guided delivery of buffered, scanned individually packaged products into the container kept ready the buffer being provided at the longitudinal end of the first conveying track.

20. A device for recognizing and guiding individually packaged products provided with a code, the device comprising:
a conveying track having a V-shaped cross section;
a scanning device with a plurality of individual scanners;
a central computer, whereby the individually packaged products of a quantity, are guided separated and centered on the conveying track, which has the V-shaped cross section, through the scanning device with the plurality of individual scanners and are identified in the scanning device by reading the code of the individually packaged product as actual data and are then compared or detected with the desired data, stored in the central computer, of the individually packaged product quantity, and if there is disagreement of the desired data with the actual data, the individually packaged product is separated out, wherein the conveying track, which has the V-shaped cross section, has one V leg comprising a driven individually packaged product-conveying element on which the conveyed individually packaged product lies in a nonsliding manner, and has another V leg comprising a stationary individually packaged product-sliding element on which the conveyed individually packaged product slides;

a selecting means, for a lateral or lower ejection of individually packaged products that are not recognized by the scanning device or are to be sorted out, the selecting means being provided in an area of a longitudinal end of the first conveying track;

another conveying track wherein ejected, non-recognized individually packaged products can be returned on the another conveying track for a manual scanning by means of a hand scanner and optionally for sorting out in the area of the inlet of the first conveying track and can be received in a provided container;

a third conveying track, wherein a container kept ready that is empty or filled with hand-scanned individually packaged products on the third conveying track can be conveyed from the area of the inlet of the conveying track under the longitudinal end of the conveying track into a ready position; and a buffer with a flap that can be opened on the bottom for a guided delivery of buffered, scanned individually packaged products into the container kept ready the buffer being provided at the longitudinal end of the first conveying track.

21. A device for recognizing and guiding individually packaged products provided with a code, the device comprising:

a conveying track having a V-shaped cross section;

a scanning device with a plurality of individual scanners;

a central computer, whereby the individually packaged products of a quantity, are guided separated and centered on the conveying track, which has the V-shaped cross section, through the scanning device with the plurality of individual scanners and are identified in the scanning device by reading the code of the individually packaged product as actual data and are then compared or detected with the desired data, stored in the central computer, of the individually packaged product quantity, and if there is disagreement of the desired data with the actual data, the individually packaged product is separated out, wherein the conveying track, which has the V-shaped cross section, has one V leg comprising a driven individually packaged product-conveying element on which the conveyed individually packaged product lies in a nonsliding manner, and has another V leg comprising a stationary individually packaged product-sliding element on which the conveyed individually packaged product slides; and a selecting means, for a lateral or lower ejection of individually packaged products that are not recognized by the scanning device or are to be sorted out, the selecting means being provided in an area of a longitudinal end of the first conveying track, wherein the selecting means, which can be controlled by means of the central computer, has at least one transverse pusher, at least one diverter or at least one pivoting flap, which releases an ejection opening, said pivoting flap being a counter-controlled double flap with two pivot axes.

22. A device for recognizing and guiding individually packaged products provided with a code, the device comprising:

a conveying track having a V-shaped cross section;

a scanning device with a plurality of individual scanners;

a central computer, whereby the individually packaged products of a quantity, are guided separated and centered on the conveying track, which has the V-shaped cross section, through the scanning device with the plurality of individual scanners and are identified in the scanning device by reading the code of the individually packaged product as actual data and are then compared or detected with the desired data, stored in the central computer, of the individually packaged product quantity, and if there is disagreement of the desired data with the actual data, the individually packaged product is separated out, wherein the conveying track, which has the V-shaped cross section, has one V leg comprising a driven individually packaged product-conveying element on which the conveyed individually packaged product lies in a nonsliding manner, and has another V leg comprising a stationary individually packaged product-sliding element on which the conveyed individually packaged product slides;

a selecting means, for a lateral or lower ejection of individually packaged products that are not recognized by the scanning device or are to be sorted out, the selecting means being provided in an area of a longitudinal end of the first conveying track;

another conveying track wherein ejected, non-recognized individually packaged products can be returned on the another conveying track for a manual scanning by means of a hand scanner and optionally for sorting out in the area of the inlet of the first conveying track and can be received in a provided container; and a spacer for a simultaneous manual entry of two individually packaged products spaced apart from one another on the first conveying track, whereby the spacer is preferably the keyboard of the terminal.

* * * * *